US012105469B2

(12) United States Patent
Sugawara et al.

(10) Patent No.: US 12,105,469 B2
(45) Date of Patent: Oct. 1, 2024

(54) ELECTROSTATIC CHARGE IMAGE DEVELOPING TONER, ELECTROSTATIC CHARGE IMAGE DEVELOPER, METHOD FOR PRODUCING ELECTROSTATIC CHARGE IMAGE DEVELOPING TONER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Atsushi Sugawara, Minamiashigara (JP); Hiroshi Nakazawa, Minamiashigara (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 589 days.

(21) Appl. No.: 17/400,172

(22) Filed: Aug. 12, 2021

(65) Prior Publication Data

US 2022/0373903 A1 Nov. 24, 2022

(30) Foreign Application Priority Data

May 21, 2021 (JP) ................................ 2021-086309

(51) Int. Cl.

| | |
|---|---|
| ***G03G 9/087*** | (2006.01) |
| ***G03G 9/08*** | (2006.01) |
| ***G03G 9/097*** | (2006.01) |
| ***G03G 15/08*** | (2006.01) |
| ***G03G 21/18*** | (2006.01) |

(52) U.S. Cl.

CPC ......... *G03G 9/0819* (2013.01); *G03G 9/0804* (2013.01); *G03G 9/08755* (2013.01); *G03G 9/09733* (2013.01); *G03G 15/08* (2013.01); *G03G 21/1814* (2013.01)

(58) Field of Classification Search

CPC .................................................. G03G 9/08782

See application file for complete search history.

(56) References Cited

U.S. PATENT DOCUMENTS

| | | | |
|---|---|---|---|
| 2010/0209840 | A1 | 8/2010 | Kuta et al. |
| 2017/0115585 | A1 | 4/2017 | Hong et al. |
| 2017/0227873 | A1 | 8/2017 | Sugawara et al. |

(Continued)

FOREIGN PATENT DOCUMENTS

| | | | |
|---|---|---|---|
| JP | H09-211889 | A | 8/1997 |
| JP | 2005-140987 | A | 6/2005 |

(Continued)

OTHER PUBLICATIONS

Translation of JP 2017-142401.*

(Continued)

*Primary Examiner* — Peter L Vajda

(74) *Attorney, Agent, or Firm* — Oliff PLC

(57) ABSTRACT

An electrostatic charge image developing toner includes a toner particle containing a binder resin and a releasing agent, and the following requirement (1) is satisfied in cross section observation of the toner particle: requirement (1): the number of a releasing agent domain having a long diameter of 500 nm or more and 1,000 nm or less is 7 or more on average per toner particle.

18 Claims, 2 Drawing Sheets

(56) References Cited

U.S. PATENT DOCUMENTS

| | | | | |
|---|---|---|---|---|
| 2017/0336726 | A1* | 11/2017 | Hasegawa | G03G 9/0926 |
| 2019/0011846 | A1* | 1/2019 | Kinumatsu | G03G 9/0819 |
| 2020/0142329 | A1 | 5/2020 | Yamawaki et al. | |

FOREIGN PATENT DOCUMENTS

| | | | | |
|---|---|---|---|---|
| JP | 2016-061966 A | | 4/2016 | |
| JP | 2017-142401 | * | 8/2017 | G03G 9/09335 |
| JP | 2019-120887 A | | 7/2019 | |
| JP | 2020-076992 A | | 5/2020 | |

OTHER PUBLICATIONS

Jun. 16, 2023 Office Action issued in European Patent Application No. 21 195 628.9.

Feb. 24, 2022 extended Search Report issued in European Patent Application No. 21195628.9.

* cited by examiner

ELECTROSTATIC CHARGE IMAGE DEVELOPING TONER, ELECTROSTATIC CHARGE IMAGE DEVELOPER, METHOD FOR PRODUCING ELECTROSTATIC CHARGE IMAGE DEVELOPING TONER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2021-086309 filed on May 21, 2021.

BACKGROUND

Technical Field

The present disclosure relates to an electrostatic charge image developing toner, an electrostatic charge image developer, a method for producing an electrostatic charge image developing toner, a toner cartridge, a process cartridge, an image forming apparatus, and an image forming method.

Related Art

JP-A-2005-140987 discloses a method for producing a toner containing at least a colorant and a binder resin containing a crystalline resin as a main component, the method including: an aggregating step of mixing and aggregating a resin particle dispersion liquid in which particles of the crystalline resin having a carboxylic acid group are dispersed, the resin particle dispersion liquid having physical properties of a pH of 6.0 or more and 10.0 or less and a zeta potential of −60 mV or more and −30 mV or less, and a colorant particle dispersion liquid in which particles of the colorant are dispersed, thereby obtaining an aggregated particle dispersion liquid in which aggregated particles in which the particles of the crystalline resin and the particles of the colorant are mixed are dispersed; and a fusing step of heating and fusing the aggregated particle dispersion liquid to obtain toner particles.

JP-A-2020-076992 discloses a toner having toner particles containing a binder resin and a wax, in which As is 15.0% or less where As is a ratio of an area occupied by the wax in a region from a surface of the toner particle to depth of 0.5 μm in cross section observation of the toner using a transmission electron microscope, wax domains are observed in a cross section of the toner particle in cross section observation of the toner using the transmission electron microscope, an average number of the domains per cross section of one toner particle is 10 or more and 2,000 or less, Mi is 3.5 ppm or more and 1,100 ppm or less where Mi (ppm) is a mass concentration of a polyvalent metal element in the toner particle by fluorescence X-ray analysis, and Mi>Ms where Ms (ppm) is a mass concentration of the polyvalent metal element in the toner particle by X-ray photoelectron spectroscopy.

SUMMARY

Aspects of non-limiting embodiments of the present disclosure relate to providing an electrostatic charge image developing toner that is less likely to be crushed as compared to a case where the number of releasing agent domain having a long diameter of 500 nm or more and 1,000 nm or less is less than 7 on average per toner particle.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic charge image developing toner including a toner particle containing a binder resin and a releasing agent, in which the following requirement (1) is satisfied in cross section observation of the toner particle:

requirement (1): the number of a releasing agent domain having a long diameter of 500 nm or more and 1,000 nm or less is 7 or more on average per toner particle.

BRIEF DESCRIPTION OF THE DRAWINGS

Exemplary embodiment(s) of the present invention will be described in detail based on the following figures, wherein.

DETAILED DESCRIPTION

Figure 1:
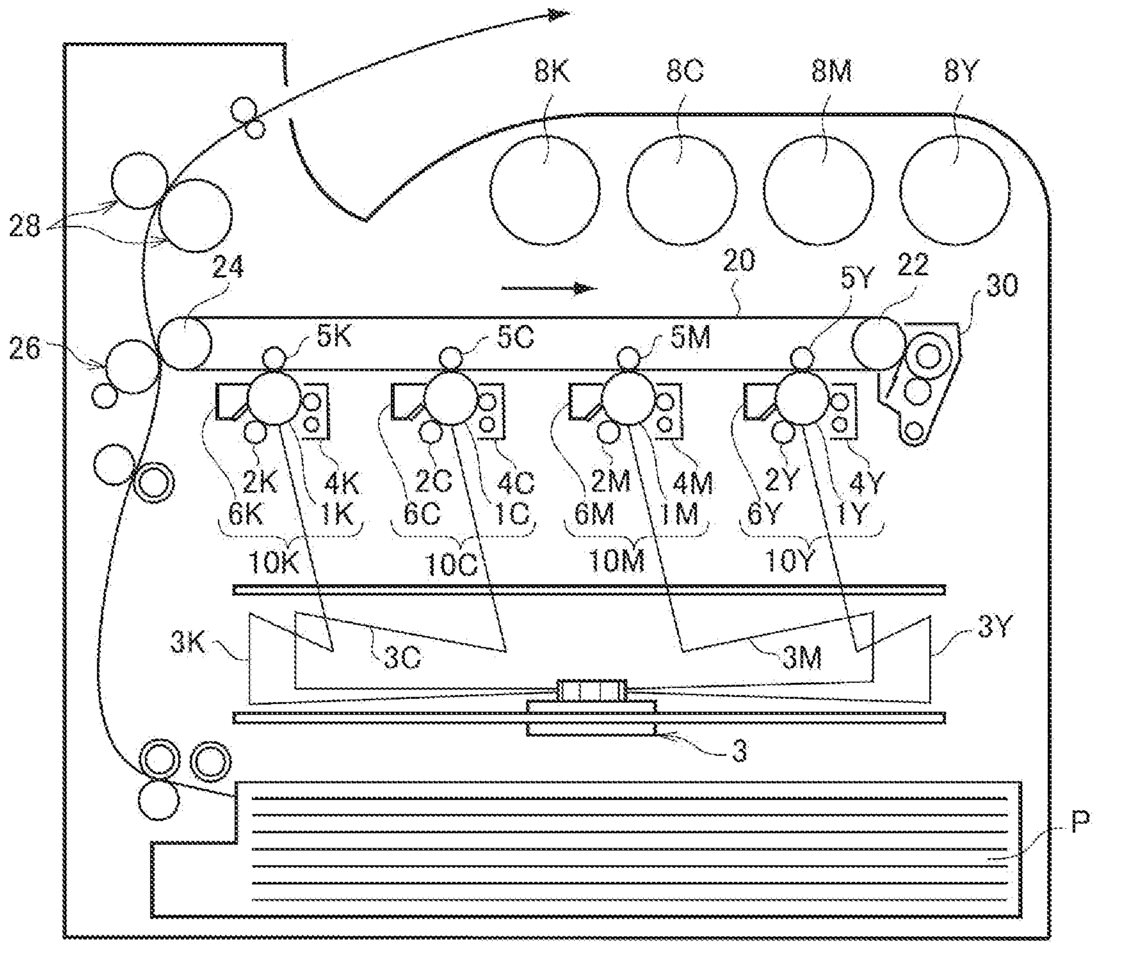
FIG. 1 is a schematic configuration diagram illustrating an example of an image forming apparatus according to the exemplary embodiment.

Hereinafter, an exemplary embodiment according to the present disclosure will be described. These descriptions and Examples illustrate the exemplary embodiment, and do not limit the scope of the exemplary embodiment.

In the present disclosure, a numerical range indicated by “to” indicates a range including numerical values before and after “to” as a minimum value and a maximum value, respectively.

In numerical ranges described in stages in the present disclosure, an upper limit or a lower limit described in one numerical range may be replaced with an upper limit or a lower limit of a numerical range described in other stages. In the numerical ranges described in the present disclosure, the upper limit or the lower limit of the numerical range may be replaced with values shown in Examples.

In the present disclosure, the term “step” indicates not only an independent step, and even when a step cannot be clearly distinguished from other steps, this step is included in the term “step” as long as an intended purpose of the step is achieved.

In the present disclosure, each component may include plural kinds of substances. In the present disclosure, in a case of referring to an amount of each component in a composition, in a case where there are plural kinds of substances corresponding to each component in the composition, unless otherwise specified, the amount of each component in a composition refers to a total amount of the plural kinds of substances present in the composition.

In the present disclosure, each component may include plural kinds of particles. In a case where there are plural kinds of particles corresponding to each component in the composition, unless otherwise specified, a particle diameter of each component means a value for a mixture of the plural kinds of particles present in the composition.

In the present disclosure, the term "(meth)acryl" means at least one of acryl and methacryl, and the term "(meth) acrylate" means at least one of acrylate and methacrylate.

In the present disclosure, the term "toner" refers to an "electrostatic charge image developing toner", the term "developer" refers to an "electrostatic charge image developer", and the term "carrier" refers to an "electrostatic charge image developing carrier".

In the present disclosure, a method of producing a toner particle by aggregating and coalescing material particles in a solvent is referred to as an emulsion aggregation (EA) method.

<Electrostatic Charge Image Developing Toner>

A toner according to the exemplary embodiment includes a toner particle containing a binder resin and a releasing agent, and satisfies the following requirement (1) in cross section observation of the toner particle.

Requirement (1): the number of a releasing agent domain having a long diameter of 500 nm or more and 1,000 nm or less is 7 or more on average per toner particle.

The toner according to the present exemplary embodiment is less likely to be crushed by satisfying the requirement (1). The toner satisfying the requirement (1) means that the releasing agent in a form of a large lump is not included in the toner panicle, the releasing agent is not included in the toner particles in a finely divided manner, and the releasing agent is included in the toner particles in a manner divided into an appropriate size. It is presumed that when a mechanical force is applied to the toner in this form, the force is dispersed in the toner particles, and releasing agent domains having the appropriate size serves as a support, so that the toner is less likely to be crushed.

In the requirement (1), the upper limit of the average number of the releasing agent domain having a long diameter of 500 nm or more and 1,000 nm or less per toner particle is not limited, and the average number is, for example, 15 or less.

The requirement (1) can be controlled by a zeta potential of a releasing agent particle dispersion liquid, a content of releasing agent particles in the releasing agent particle dispersion liquid, a content of a surfactant in the releasing agent particle dispersion liquid, and a usage amount of the releasing agent panicle dispersion liquid in a case where the toner particles are produced by the EA method.

In the toner according to the exemplary embodiment, the releasing agent domains are dispersed in the toner particles with high uniformity, and as a result, from a viewpoint that the toner is less likely to be crushed, the following requirement (A) may be satisfied in the cross section observation of the toner particle, and it is preferable that the following requirement (A') is satisfied.

Requirement (A): a distance between releasing agent domains each having a long diameter of 50 nm or more, that are next to each other, is 200 nm or more on average.

Requirement (A'): the distance between the releasing agent domains each having the long diameter of 50 nm or more, that are next to each other, is 220 nm or more on average.

In the requirements (A) and (A'), the upper limit of the average distance between releasing agent domains each having a long diameter of 50 nm or more, that are next to each other, is not limited, and the average distance is, for example, 400 nm or less.

The requirement (A) and the requirement (A') can be controlled by the zeta potential of the releasing agent particle dispersion liquid, the content of the releasing agent particles in the releasing agent particle dispersion liquid, the content of the surfactant in the releasing agent particle dispersion liquid, and the usage amount of the releasing agent particle dispersion liquid in a case where the toner particles are produced by the EA method.

In the toner according to the exemplary embodiment, from the viewpoint that the toner is less likely to be crushed, the following requirement (2) may be satisfied in the cross section observation of the toner particle, and it is preferable that the following requirement (2') is satisfied.

Requirement (2): an aspect ratio of the releasing agent domain having a long diameter of 500 nm or more and 1,000 nm or less is 3 or more and 10 or less on average.

Requirement (2'): the aspect ratio of the releasing agent domain having a long diameter of 500 nm or more and 1,000 nm or less is 3 or more and 8 or less on average.

The requirement (2) and the requirement (2') can be controlled by the zeta potential of the releasing agent particle dispersion liquid, the content of the releasing agent particles in the releasing agent particle dispersion liquid, the content of the surfactant in the releasing agent particle dispersion liquid, and the usage amount of the releasing agent particle dispersion liquid in a case where the toner particles are produced by the EA method.

In the toner according to the exemplary embodiment, from the viewpoint that the toner is less likely to be crushed, the following requirement (3) may be satisfied in the cross section observation of the toner particle, and it is preferable that the following requirement (3') is satisfied.

Requirement (3): a number percentage of a toner particle containing at least 10 releasing agent domains each having a long diameter of 500 nm or more and 1000 nm or less is 30% by number or more.

Requirement (3'): the number percentage of the toner particle containing at least 10 releasing agent domains each having a long diameter of 500 nm or more and 1000 nm or less is 50% by number or more.

In the requirement (3) and the requirement (3'), the upper limit of the number percentage of the toner particle containing at least 10 releasing agent domains each having a long diameter of 500 nm or more and 1000 nm or less is not limited, and the number percentage is, for example, 90% by number or less.

The requirement (3) and the requirement (3') can be controlled by the zeta potential of the releasing agent particle dispersion liquid, the content of the releasing agent particles in the releasing agent particle dispersion liquid, the content of the surfactant in the releasing agent particle dispersion liquid, and the usage amount of the releasing agent particle dispersion liquid in a case where the toner particles are produced by the EA method.

In the toner according to the exemplary embodiment, from the viewpoint that the toner is less likely to be crushed, the following requirement (B) may be satisfied in the cross section observation of the toner particle, and it is preferable that the following requirement (B') is satisfied.

Requirement (B): an area ratio of the releasing agent domain having a long diameter of 50 nm or more is 3% or more and 10% or less on average.

Requirement (B'): the area ratio of the releasing agent domain having a long diameter of 50 nm or more is 5% or more and 10% or less on average.

The requirement (B) and the requirement (B') can be controlled by the zeta potential of the releasing agent particle dispersion liquid, the content of the releasing agent particles in the releasing agent particle dispersion liquid, the content of the surfactant in the releasing agent particle dispersion liquid, and the usage amount of the releasing agent particle dispersion liquid in a case where the toner particles are produced by the EA method.

Hereinafter, a method of confirming each requirement will be described. In the present disclosure, the long diameter is a length of the longest straight line among all straight lines connecting two points on a contour line.

The toner particles (to which an external additive may be attached) are mixed with an epoxy resin, and the epoxy resin is solidified. The obtained solidified product is cut by an ultramicrotome apparatus (Ultracut UCT manufactured by Leica) to prepare a thin sample having a thickness of 80 nm or more and 130 nm or less. The thin sample is dyed with ruthenium tetroxide in a desiccator at 30° C. for 3 hours.

An SEM image of the dyed thin sample is obtained by an ultrahigh-resolution field emission scanning electron microscope (FE-SEM) (for example, S-4800 manufactured by Hitachi High-Technologies Corporation). In general, since the releasing agent is more easily dyed with ruthenium tetroxide than the binder resin, the releasing agent is identified in accordance with contrasting density caused by a degree of dyeing. In a case where it is difficult to determine the contrasting density due to a state of the sample or the like, a dyeing time is adjusted. In a toner particle cross section, since a colorant domain generally has a long diameter of less than 50 nm, the colorant domain can be distinguished in accordance with the size.

The SEM image includes toner particle cross sections of various sizes, and toner particle cross sections having a long diameter of 80% or more of a volume average particle diameter of the toner particles are selected from the SEM image, 300 toner particle cross sections are randomly selected from the selected cross sections, and the selected cross sections are observed.

A reason why the cross section having a long diameter of 80% or more of the volume average particle diameter is selected is that the cross section having the long diameter of less than 80% of the volume average particle diameter is assumed to be a cross section of an end portion of the toner particle, and a state of the releasing agent domains in the toner particles is not well reflected in the cross section of the end portion of the toner particle.

Requirement (1)

The total number of the releasing agent domains having a long diameter of 500 nm or more and 1000 nm or less included in the 300 toner particle cross sections is counted, and the average number per toner particle is calculated.

Requirement (2)

An aspect ratio is measured for all releasing agent domains each having a long diameter of 500 nm or more and 1000 nm or less included in the 300 toner panicle cross sections, and an average value is calculated.

The aspect ratio is a ratio of the long diameter to a short diameter (long diameter/short diameter).

The short diameter is a length of the longest straight line among straight lines that are orthogonal to a straight line forming the long diameter and that connect the contour lines facing each other.

Requirement (3)

The number of the releasing agent domains having a long diameter of 500 nm or more and 1000 nm or less included in one toner particle cross section is counted. This is performed for 300 toner particle cross sections. The number percentage of the toner particles having at least 10 releasing agent domains each having a long diameter of 500 nm or more and 1000 nm or less is calculated.

Requirement (A)

A distance (nm) between two domains is measured for all releasing agent domains each having a long diameter of 50 nm or more in one toner particle cross section. The distance between the two domains is the shortest distance connecting the contour lines of the two domains. Further, measurement is performed on the 300 toner particle cross sections, and an average value (nm) is calculated.

Requirement (B)

A total area of 300 toner particle cross sections and a total area of the releasing agent domains each having a long diameter of 50 nm or more included in the 300 toner particle cross sections are measured, and an area ratio is calculated by dividing the latter by the former.

Hereinafter, the toner according to the exemplary embodiment will be described in detail.

The toner according to the exemplary embodiment includes a toner particle and, if necessary, an external additive.

<Toner Particle>

The toner particle includes, for example, a binder resin, and if necessary, a colorant, a releasing agent, and other additive(s).

Binder Resin

Examples of the binder resin include vinyl-based resins composed of a homopolymer of monomers such as styrenes (such as styrene, parachlorostyrene, and α-methylstyrene), (meth)acrylic acid esters (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), or olefins (such as ethylene, propylene, and butadiene), or a copolymer obtained by combining two or more kinds of these monomers.

Examples of the binder resin include non-vinyl-based resins such as an epoxy resin, a polyester resin, a polyurethane resin, a polyamide resin, a cellulose resin, a polyether resin, and a modified rosin, a mixture of the non-vinyl-based resin and the vinyl-based resin, and a graft polymer obtained by polymerizing a vinyl-based monomer in the presence of these.

These binder resins may be used alone or in combination of two or more thereof.

The binder resin may be a polyester resin.

Examples of the polyester resin include a common amorphous polyester resin. As the polyester resin, the crystalline polyester resin may be used in combination with the amorphous polyester resin. However, the crystalline polyester resin may be used in a range of a content thereof being 2 mass % or more and 40 mass % or less (preferably 2 mass % or more and 20 mass % or less) relative to a total amount of the binder resin.

"Crystalline" of a resin means that the resin has a clear endothermic peak rather than a stepwise endothermic change in differential scanning calorimetry (DSC), and specifically means that a half width of the endothermic peak when measured at a temperature rising rate of 10° C./min is within 10° C.

The term "amorphous" of a resin means that a half width exceeds 10° C., a stepwise change in an endothermic change is exhibited, or a clear endothermic peak is not observed.

Amorphous Polyester Resin

Examples of the amorphous polyester resin include a condensed polymer of a polycarboxylic acid and a polyhydric alcohol. As the amorphous polyester resin, a commercially available product may be used, or a synthetic resin may be used.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower alkyl esters (for example, having 1 to 5 carbon atoms) thereof. Among these, the polycarboxylic acid is preferably, for example, an aromatic dicarboxylic acid.

As the polycarboxylic acid, a tricarboxylic acid or higher carboxylic acid having a cross-linked structure or a branched structure may be used in combination with a dicarboxylic acid. Examples of the tricarboxylic acid or higher carboxylic acid include trimellitic acid, pyromellitic acid, and an anhydride thereof or a lower alkyl ester (such as having 1 to 5 carbon atoms) thereof.

The polycarboxylic acid may be used alone or in combination of two or more kinds thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). Among these, the polyhydric alcohol is preferably, for example, an aromatic diol and an alicyclic diol, and more preferably an aromatic diol.

As the polyhydric alcohol, a trihydric alcohol or higher polyhydric alcohol having a cross-linked structure or a branched structure may be used in combination with a diol. Examples of the trihydric alcohol or higher polyhydric alcohol include glycerin, trimethylolpropane, and pentaerythritol.

The polyhydric alcohol may be used alone or in combination of two or more kinds thereof.

A glass transition temperature (Tg) of the amorphous polyester resin may be 50° C. or higher and 80° C. or lower, and is preferably 50° C. or higher and 65° C. or lower.

The glass transition temperature is determined from a DSC curve obtained by the differential scanning calorimetry (DSC), and is more specifically determined by an "extrapolated glass transition onset temperature" described in a method for obtaining the glass transition temperature "Method for measuring glass transition temperature of plastics" in JIS K 7121-1987.

A weight average molecular weight (Mw) of the amorphous polyester resin may be 5,000 or more and 1,000,000 or less, and is preferably 7,000 or more and 500,000 or less.

A number average molecular weight (Mn) of the amorphous polyester resin may be 2,000 or more and 100,000 or less.

A molecular weight distribution Mw/Mn of the amorphous polyester resin may be 1.5 or more and 100 or less, and is preferably 2 or more and 60 or less.

The weight average molecular weight and the number average molecular weight are measured by gel permeation chromatography (GPC). The molecular weight is measured by GPC using a GPC-HLC-8120GPC manufactured by Tosoh Corporation as a measurement apparatus, a column TSKgel SuperHM-M (15 cm) manufactured by Tosoh Corporation, and using a THF solvent. The weight average molecular weight and the number average molecular weight are calculated based on the measurement results using a molecular weight calibration curve prepared using a monodispersed polystyrene standard sample.

The amorphous polyester resin is obtained by a common production method. Specifically, for example, the amorphous polyester resin is obtained by a method in which a polymerization temperature is set to 180° C. or higher and 230° C. or lower, the pressure inside a reaction system is reduced as necessary, and reaction is performed while removing water and alcohols generated during the condensation.

In a case where raw material monomers are not dissolved or compatible at a reaction temperature, a solvent having a high boiling point may be added as a dissolution aid to dissolve the monomers. In this case, a polycondensation reaction is performed while distilling off the dissolution aid. In a case where there is a monomer having poor compatibility in a copolymerization reaction, the monomer having the poor compatibility may be firstly condensed with an acid or alcohol to be polycondensed with the monomer, and then the obtained product is polycondensed with the main component.

Crystalline Polyester Resin

Examples of the crystalline polyester resin include a polycondensate of a polycarboxylic acid and a polyhydric alcohol. As the crystalline polyester resin, a commercially available product may be used, or a synthetic resin may be used.

Here, in order to easily form a crystal structure, the crystalline polyester resin may be a polycondensate using a linear aliphatic polymerizable monomer rather than a polymerizable monomer having an aromatic ring.

Examples of the polycarboxylic acid include aliphatic dicarboxylic acids (such as oxalic acid, succinic acid, glutaric acid, adipic acid, suberic acid, azelaic acid, sebacic acid, 1,9-nonandicarboxylic acid, 1,10-decandicarboxylic acid, 1,12-dodecanedicarboxylic acid, 1,14-tetradecanedicarboxylic acid, and 1,18-octadecanedicarboxylic acid), aromatic dicarboxylic acids (e.g. dibasic acids such as phthalic acid, isophthalic acid, terephthalic acid, and naphthalene-2,6-dicarboxylic acid), anhydrides thereof, or lower alkyl esters (for example, having 1 to 5 carbon atoms) thereof.

As the polycarboxylic acid, a tricarboxylic acid or higher carboxylic acid having a cross-linked structure or a branched structure may be used in combination with a dicarboxylic acid. Examples of the tricarboxylic acid include aromatic carboxylic acids (such as 1,2,3-benzenetricarboxylic acid, 1,2,4-benzenetricarboxylic acid, and 1,2,4-naphthalenetricarboxylic acid), anhydrides thereof, and lower alkyl esters (for example, having 1 to 5 carbon atoms) thereof.

As the polycarboxylic acid, a dicarboxylic acid having a sulfonic acid group and a dicarboxylic acid having an ethylenic double bond may be used in combination with these dicarboxylic acids.

The polycarboxylic acid may be used alone or in combination of two or more kinds thereof.

Examples of the polyhydric alcohol include aliphatic diols (such as linear aliphatic diols having 7 to 20 carbon atoms in the main chain part). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecandiol, 1,14-tetradecanediol, 1,18-octadecanediol, and 1,20-eicosanediol. Among these, the aliphatic diol is preferably 1,8-octanediol, 1,9-nonanediol, or 1,10-decanediol.

As the polyhydric alcohol, a trihydric or higher alcohol having a crosslinked structure or a branched structure may be used in combination with the diol. Examples of the trihydric or higher alcohol include glycerin, trimethylolethane, trimethylolpropane, and pentaerythritol.

The polyhydric alcohol may be used alone or in combination of two or more kinds thereof.

Here, the polyhydric alcohol may have an aliphatic diol content of 80 mol % or more, and preferably 90 mol % or more.

A melting temperature of the crystalline polyester resin may be 50° C. or higher and 100° C. or lower, and is preferably 55° C. or higher and 90° C. or lower, and more preferably 60° C. or higher and 85° C. or lower.

The melting temperature is determined from the DSC curve obtained by differential scanning calorimetry (DSC) in accordance with the "melting peak temperature" described in a method for obtaining the melting temperature in "Method for measuring transition temperature of plastics" in JIS K 7121-1987.

A weight average molecular weight (Mw) of the crystalline polyester resin may be 6,000 or more and 35,000 or less.

The crystalline polyester resin can be obtained by, for example, a common production method same as the amorphous polyester resin.

A content of the binder resin may be 40 mass % or more and 95 mass % or less, and is preferably 50 mass % or more and 90 mass % or less, and more preferably 60 mass % or more and 85 mass % or less, relative to a total amount of the toner particles.

Colorant

Examples of the colorant include pigments such as carbon black, Chrome Yellow, Hansa Yellow, Benzidine Yellow, Thlene Yellow, Quinoline Yellow, Pigment Yellow, Permanent Orange GTR, Pyrazolone Orange, Vulkan Orange, Watchung Red, Permanent Red, Brilliant Carmine 3B, Brilliant Carmine 6B, DuPont Oil Red, Pyrazolone Red, Lithol Red, Rhodamine B Lake. Lake Red C, Pigment Red. Rose Bengal. Aniline Blue, Ultramarine Blue, Calco Oil Blue, Methylene Blue Chloride, Phthalocyanine Blue, Pigment Blue, Phthalocyanine Green, and Malachite Green Oxalate; and acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorant may be used alone or in combination of two or more kinds thereof.

As the colorant, a surface-treated colorant may be used as necessary, or the colorant may be used in combination with a dispersant. Plural kinds of colorants may be used in combination.

A content of the colorant may be 1 mass % or more and 30 mass % or less, and is preferably 3 mass % or more and 15 mass % or less, relative to the total amount of the toner particles.

Releasing Agent

Examples of the releasing agent include hydrocarbon wax, natural wax such as carnauba wax, rice wax, and candelilla wax, synthetic wax or mineral or petroleum wax such as montan wax, and ester wax such as fatty acid ester and montanic acid ester. The releasing agent is not limited thereto.

The melting temperature of the releasing agent may be relatively high, and is preferably 80° C. or higher and 95° C. or lower, more preferably 84° C. or higher and 92° C. or lower, and still more preferably 86° C. or higher and 90° C. or lower, from a viewpoint of dispersing the releasing agent domains in the toner particles in an appropriate size in a production process.

The melting temperature of the release agent is determined based on a DSC curve obtained by differential scanning calorimetry (DSC) in accordance with "melting peak temperature" described in the method of determining the melting temperature in "Testing Methods for Transition Temperatures of Plastics" in in JIS K7121-1987.

A content of the releasing agent may be 1 mass % or more and 20 mass % or less, and is preferably 5 mass % or more and 15 mass % or less, relative to the total amount of the toner particles.

Other Additives

Examples of the other additives include common additives such as a magnetic body, an electrostatic charge control agent, and an inorganic powder. These additives are contained in the toner particles as internal additives.

Characteristics of Toner Particles

The toner particle may be a toner particle having a single-layer structure, or may be a toner particle having a so-called core-shell structure composed of a core portion (core particle) and a coating layer (shell layer) that covers the core portion.

The toner particle having the core-shell structure may include, for example, a core portion containing a binder resin and, if necessary, other additives such as a colorant and a releasing agent, and a coating layer containing the binder resin.

A volume average particle diameter (D50v) of the toner particle may be 2 μm or more and 10 μm or less, and is preferably 4 μm or more and 8 μm or less.

Various average particle diameter and various particle size distribution indices of the toner particles are measured by using a Coulter Multisizer II (manufactured by Beckman Coulter, Inc.) and ISOTON-II (manufactured by Beckman Coulter, Inc.) as an electrolytic solution.

In the measurement, 0.5 mg or more and 50 mg or less of a measurement sample is added to 2 ml of a 5 mass % aqueous solution of a surfactant (preferably sodium alkylbenzene sulfonate) as a dispersant. The obtained mixture is added to 100 ml or more and 150 ml or less of the electrolytic solution.

The electrolytic solution in which the sample is suspended is dispersed for 1 minute with an ultrasonic disperser, and the Coulter Multisizer II is used to measure a particle size distribution of particles having a particle diameter in a range of 2 μm or more and 60 μm or less by using an aperture having an aperture diameter of 100 μm. The number of the particles to be sampled is 50,000.

A cumulative distribution of the volume and a cumulative distribution of the number are respectively drawn from a small diameter side with respect to the particle size range (channel) divided based on the measured particle size distribution, and particle diameters at which a cumulative percentage is 16% are respectively defined as a volume particle diameter D16v and a number particle diameter D16p, particle diameters at which the cumulative percentage is 50% are respectively defined as a volume average particle diameter D50v and a cumulative number average particle diameter D50p, and particle diameters at which the cumulative percentage is 84% are respectively defined as a volume particle diameter D84v and a number particle diameter D84p.

Using these, the volume particle size distribution index (GSDv) is calculated as $(D84v/D16v)^{1/2}$, and the number particle size distribution index (GSDp) is calculated as $(D84p/D16p)^{1/2}$.

An average circularity of the toner particle may be 0.94 or more and 1.00 or less, and is preferably 0.95 or more and 0.98 or less.

The average circularity of the toner particles is determined from the following calculation: (circle equivalent perimeter)/(perimeter) (i.e. (perimeter of circle having the same projection area as particle image)/(perimeter of the projected particle image)). Specifically, the average circularity of the toner particles is a value measured by the following method.

First, the toner particles as measurement targets are sucked and collected to form a flat flow, and flash light is emitted instantly to capture a particle image as a still image. The average circularity is determined by a flow-type particle image analyzer (FPIA-3000 manufactured by Sysmex Corporation) that analyzes the particle image. The number of samples for determining the average circularity is 3,500.

In a case where the toner contains an external additive, the toner (developer) as a measurement target is dispersed in water containing a surfactant, and then an ultrasonic treatment is performed to obtain toner particles from which the external additive is removed.

<External Additive>

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

The surfaces of the inorganic particles as the external additive may be subjected to a hydrophobic treatment. The hydrophobic treatment is performed by, for example, immersing the inorganic particles in a hydrophobic treatment agent. The hydrophobic treatment agent is not particularly limited, and examples thereof include a silane coupling agent, a silicone oil, a titanate coupling agent, and an aluminum coupling agent. The hydrophobic treatment agent may be used alone or in combination of two or more kinds thereof.

An amount of the hydrophobic treatment agent is generally, for example, 1 part by mass or more and 10 parts by mass or less relative to 100 parts by mass of the inorganic particles.

Examples of the external additive also include resin particles (resin particles of polystyrene, polymethylmethacrylate, melamine resin or the like), and cleaning activators (for example, metal salts of higher fatty acids represented by zinc stearate, and particles of a fluoropolymer).

An amount of the external additive externally added may be, for example, 0.01 mass % or more and 5 mass % or less, and is preferably 0.01 mass % or more and 2.0 mass % or less, relative to the toner particles.

<Method for Producing Electrostatic Charge Image Developing Toner>

A method for producing the toner according to the exemplary embodiment is a method for producing the toner including producing the toner particles by the EA method, and includes the following mixing step, aggregating step, and coalescing step.

Mixing step: a step of mixing a binder resin particle dispersion liquid containing a binder resin particle and a releasing agent particle dispersion liquid containing a releasing agent particle to prepare a mixed dispersion liquid containing the binder resin particle and the releasing agent particle.

Aggregating step: a step of aggregating the binder resin particle and the releasing agent particle in the mixed dispersion liquid to form an aggregated particle.

Coalescing step: a step of heating the dispersion liquid containing the aggregated particle to fuse and coalesce the aggregated particle, thereby forming a toner particle.

In the method for producing the toner according to the exemplary embodiment, a zeta potential of the binder resin particle dispersion liquid and a zeta potential of the releasing agent particle dispersion liquid are both negative values, and a difference between a value of the zeta potential of the binder resin particle dispersion liquid and a value of the zeta potential of the releasing agent particle dispersion liquid is 0 mV or more and 30 mV or less.

In a case where plural kinds of binder resin particle dispersion liquids are prepared, the binder resin particle dispersion liquid having a largest amount of the resin to be mixed into the mixed dispersion liquid may satisfy the above-described requirements.

In a case where plural kinds of releasing agent particle dispersion liquids are prepared, the releasing agent particle dispersion liquid having a largest amount of the releasing agent to be mixed into the mixed dispersion liquid may satisfy the above-described requirements.

In a case where the difference between the value of the zeta potential of the binder resin particle dispersion liquid and the value of the zeta potential of the releasing agent particle dispersion liquid exceeds 30 mV, the releasing agent particles are aggregated in the aggregating step, and the releasing agent tends to form a lump and be contained in the toner particle. In order for the releasing agent to be contained in the toner particles in the appropriate size, the difference between the value of the zeta potential of the binder resin particle dispersion liquid and the value of the zeta potential of the releasing agent particle dispersion liquid is 0 mV or more and 30 mV or less, preferably 0 mV or more and 25 mV or less, and more preferably 0 mV or more and 20 mV or less.

In the exemplary embodiment, the zeta potentials of the binder resin particle dispersion liquid and the releasing agent particle dispersion liquid are measured by an electrophoresis method (also referred to as a laser Doppler method). The measurement apparatus is, for example, a zeta potential measurement system ELSZ-2000Z or ELSZ-2000ZS manufactured by Otsuka Electronics Co., Ltd.

A part of the particle dispersion liquid is taken and used as a sample to be measured without dilution and pH adjustment. A liquid temperature of the sample to be measured at a time of measurement is 25° C.

Hereinafter, steps and materials in the method for producing a toner according to the exemplary embodiment will be described in detail.

<Mixing Step>

The mixing step is a step of mixing at least the binder resin particle dispersion liquid and the releasing agent particle dispersion liquid. In the mixing step, the colorant particle dispersion liquid may be further mixed. An order of mixing these particle dispersion liquids is not limited.

The mixed dispersion liquid prepared in the mixing step contains at least the binder resin particle and the releasing agent particle, and may further contain the colorant particle.

Hereinafter, one(s) being common to the binder resin particle dispersion liquid, the release agent particle dispersion liquid, and the colorant particle dispersion liquid will be collectively referred to as a "particle dispersion liquid".

An example of an exemplary embodiment of the particle dispersion liquid is a dispersion liquid in which a material is dispersed in a dispersion medium in the form of particles by a surfactant.

The dispersion medium of the particle dispersion liquid may be an aqueous medium. Examples of the aqueous medium include water and alcohol. The water may be water having a reduced ion content, such as distilled water or ion exchange water. These aqueous media may be used alone or in combination of two or more kinds thereof.

Examples of the surfactant for dispersing the material in the dispersion medium include anionic surfactants such as a sulfate-based surfactant, sulfonate-based surfactant, phosphate-based surfactant, and soap-based surfactant, cationic surfactants such as an amine salt-based surfactant and quaternary ammonium salt-based surfactant, and non-ionic surfactants such as a polyethylene glycol-based surfactant, alkylphenol ethylene oxide adduct-based surfactant, and polyhydric alcohol-based surfactant. The surfactant may be used alone or in combination of two or more kinds thereof. The non-ionic surfactant may be used in combination with the anionic surfactant or a cationic surfactant.

Examples of the method for dispersing the materials in the form of particles in the dispersion medium include common dispersion methods using, for example, a rotary shear homogenizer, a ball mill having media, a sand mill, a dyno mill, and the like.

Examples of the method for dispersing the resin in the form of particles in the dispersion medium include a phase inversion emulsification method. In the phase inversion emulsification method, the resin is dissolved in a hydrophobic organic solvent in which the resin is soluble, and a base is added to an organic continuous phase (O phase) to neutralize the resin, and then an aqueous medium (W phase) is added to perform phase inversion from W/O to O/W, and the resin is dispersed in the aqueous medium in the form of particles.

The volume average particle diameter of the particles dispersed in the particle dispersion liquid may be 30 nm or more and 300 nm or less, and is preferably 50 nm or more and 250 nm or less, and more preferably 80 nm or more and 200 nm or less.

The volume average panicle diameter of the particles in the particle dispersion liquid refers to a particle diameter at which accumulation is 50% from the small diameter side in a particle size distribution measured by a laser diffraction size diameter distribution measurement apparatus (for example, LA-700 manufactured by Horiba, Ltd.).

A content of the particles contained in the particle dispersion liquid may be 5 mass % or more and 50 mass % or less, and is preferably 10 mass % or more and 40 mass % or less, and more preferably 15 mass % or more and 30 mass % or less.

A value of a zeta potential of a binder resin particle dispersion liquid having a largest amount of the resin mixed into the mixed dispersion liquid may be −60 mV or more and −20 mV or less, and is preferably −60 mV or more and −30 mV or less, and more preferably −60 mV or more and −40 mV or less from a viewpoint of dispersion stability of the binder resin particles in the binder resin particle dispersion liquid and the mixed dispersion liquid.

The zeta potential of the binder resin particle dispersion liquid is controlled by, for example, a kind of a polymerization component of the resin, and a kind and amount of the surfactant contained in the resin particle dispersion liquid.

A value of a zeta potential of the releasing agent particle dispersion liquid having a largest amount of the releasing agent mixed into the mixed dispersion liquid may be −70 mV or more and −30 mV or less, and is preferably −65 mV or more and −35 mV or less, and more preferably −60 mV or more and −40 mV or less from a viewpoint of reducing the difference between the zeta potential of the binder resin particle dispersion liquid and the zeta potential of the release agent particle dispersion liquid and a viewpoint of the dispersion stability of the releasing agent particles in the releasing agent panicle dispersion liquid and the mixed dispersion liquid.

The zeta potential of the release agent particle dispersion liquid is controlled by, for example, a kind of the releasing agent, and a kind and amount of the surfactant contained in the release agent particle dispersion liquid.

The zeta potential of the releasing agent particle dispersion liquid can also be controlled by adjusting a temperature at a time of preparing the releasing agent particle dispersion liquid. After the releasing agent and the solvent are mixed, a liquid temperature is raised to a temperature equal to or higher than the melting temperature of the releasing agent to perform a dispersion treatment, and then the liquid is cooled to a room temperature. During the cooling, the liquid temperature is maintained in a range of 35° C. or more and 40° C. or less for 30 minutes or more and 90 minutes or less. By this operation, an amount of the surfactant adhering to the surfaces of the releasing agent particles increases, and the zeta potential of the releasing agent particle dispersion liquid can be lowered.

The mixed dispersion liquid may contain the surfactant from the viewpoint of dispersion stability of the particles.

A content of the surfactant contained in the mixed dispersion liquid may be 1 mass % or more and 3 mass % or less, and is preferably 1.5 mass % or more and 3 mass % or less, and more preferably 2 mass % or more and 3 mass % or less, relative to a total mass of the mixed dispersion liquid from a viewpoint of dispersing material particles in the mixed dispersion liquid with high uniformity and producing a toner satisfying the requirements (1) to (5).

A mass ratio of the particles contained in the mixed dispersion liquid may be in the following range from a viewpoint that the finished toner is less likely to be crushed.

The mass ratio of the binder resin particles to the releasing agent particles may be 97:3 to 85:15, and is preferably 95:5 to 88:12, and more preferably 93:7 to 90:10.

In the case where the mixed dispersion liquid contains the colorant particles, the mass ratio of the binder resin particles to the colorant particles may be 97:3 to 85:15, and is preferably 96:4 to 88:12, and more preferably 95:5 to 90:10.

The mixing step may include adjusting the pH of the mixed dispersion liquid to a range of 4.5 or more and 6.0 or less. In the case where the mixed dispersion liquid having the pH in the range of 4.5 or more and 6.0 or less is used in the aggregating step, the material particles having the value of the zeta potential in the particle dispersion liquid in the range described above are likely to aggregate.

Examples of a method for adjusting the pH of the mixed dispersion liquid include addition of a nitric acid aqueous solution, a hydrochloric acid aqueous solution, or a sulfuric acid aqueous solution, that are acidic aqueous solutions.

<Aggregating Step (First Aggregating Step)>

The aggregating step is a step of aggregating at least the binder resin particle and the releasing agent particle to form the aggregated particle. In the aggregating step, the colorant particle may also be aggregated.

In a case where the method for producing a toner according to the exemplary embodiment includes a second aggregating step (step of forming a shell layer) to be described later, the above aggregating step is referred to as a "first aggregating step". The first aggregating step is a step of forming a core in a toner having a core-shell structure.

The aggregating step includes: for example, adding an aggregating agent to the mixed dispersion liquid while stirring the mixed dispersion liquid: and heating the mixed dispersion liquid while stirring the mixed dispersion liquid to increase the temperature of the mixed dispersion liquid after adding the aggregating agent to the mixed dispersion liquid.

Examples of the aggregating agent include a surfactant having a polarity opposite to that of the surfactant contained in the mixed dispersion liquid, an inorganic metal salt, and a divalent or higher metal complex. The aggregating agent may be used alone or in combination of two or more kinds thereof.

Examples of the inorganic metal salt include metal salts such as calcium chloride, calcium nitrate, barium chloride, magnesium chloride, zinc chloride, aluminum chloride, and aluminum sulfate, and inorganic metal salt polymers such as polyaluminum chloride, polyaluminum hydroxide, and calcium polysulfide.

As the aggregating agent, a divalent or higher valent metal salt compound is preferable, a trivalent metal salt compound is more preferable, and a trivalent inorganic aluminum salt compound is still more preferable. Examples of the trivalent inorganic aluminum salt compound include aluminum chloride, aluminum sulfate, polyaluminum chloride, and polyaluminum hydroxide.

An addition amount of the aggregating agent is not limited. In a case where the trivalent metal salt compound is used as the aggregating agent, an addition amount of the trivalent metal salt compound may be 0.3 parts by mass or more and 2 parts by mass or less, and is preferably 0.5 parts by mass or more and 1.5 parts by mass or less, and more preferably 0.6 parts by mass or more and 1.3 parts by mass or less, relative to 100 parts by mass of the binder resin.

A reaching temperature of the mixed dispersion liquid when the mixed dispersion liquid is heated may be a temperature based on the glass transition temperature (Tg) of the binder resin particle, and is for example, (Tg−30° C.) or more and (Tg−10° C.) or less.

In a case where the mixed dispersion liquid contains plural kinds of binder resin particles having different Tg values, a lowest temperature among the Tg values is defined as the glass transition temperature in the aggregating step.

<Second Aggregating Step>

The second aggregating step is provided for a purpose of producing the toner having the core-shell structure, and is provided after the first aggregating step. The second aggregating step is a step of forming a shell layer.

The second aggregating step is a step of mixing a dispersion liquid containing the aggregated particle and a dispersion liquid containing the resin particle to be the shell layer, and aggregating the resin particle to be the shell layer on the surfaces of the aggregated particle to form a second aggregated particle.

As the dispersion liquid containing the resin particle to be the shell layer, a binder resin particle dispersion liquid for forming a core is preferable, a polyester resin particle dispersion liquid is more preferable, and an amorphous polyester resin particle dispersion liquid is still more preferable.

The second aggregating step includes: for example, adding the dispersion liquid containing the resin particle to be the shell layer to the dispersion liquid containing the aggregated particle while stirring the dispersion liquid containing the aggregated particle; and heating and stirring the dispersion liquid containing the aggregated particle after adding the dispersion liquid containing the resin particle to be the shell layer.

A reaching temperature of the dispersion liquid containing the aggregated particle when the dispersion liquid containing the aggregated particle is heated may be a temperature based on the glass transition temperature (Tg) of the resin particle to be the shell layer, and is for example, (Tg−30° C.) or more and (Tg−10° C.) or less.

In order to stop a growth of the aggregated particle or the second aggregated particle after the aggregated particle or the second aggregated particle grows to a preset size and before heating in the coalescing step, a chelating agent for the aggregating agent used in the aggregating step may be added to the dispersion liquid containing the aggregated particle or the second aggregated particle.

Examples of the chelating agent include oxycarboxylic acids such as tartaric acid, citric acid, and gluconic acid, and aminocarboxylic acids such as iminodiacetic acid (IDA), nitrilotriacetic acid (NTA), and ethylenediaminetetraacetic acid (EDTA).

An addition amount of the chelating agent may be 0.01 pans by mass or more and 5.0 parts by mass or less, and is preferably 0.1 parts by mass or more and less than 3.0 parts by mass, relative to 100 parts by mass of the binder resin particle.

In order to stop the growth of the aggregated particle or the second aggregated particle after the aggregated particle or the second aggregated particle grow to the preset size and before the heating in the coalescing step, a pH of the dispersion liquid containing the aggregated particle or the second aggregated particle may be increased.

Examples of the method for increasing the pH of the dispersion liquid containing the aggregated particle or the second aggregated particle include addition of at least one selected from the group consisting of an aqueous solution of an alkali metal hydroxide and an aqueous solution of an alkaline earth metal hydroxide.

A reaching pH of the dispersion liquid containing the aggregated particle or the second aggregated particle may be 8 or more and 10 or less.

<Coalescing Step>

The coalescing step is a step of heating the dispersion liquid containing the aggregated particle to fuse and coalesce the aggregated particle, thereby forming the toner particle.

In a case where the second aggregating step is provided before the coalescing step, the coalescing step is a step of heating the dispersion liquid containing the second aggregated particle to fuse and coalesce the second aggregated particle, thereby forming the toner particle. Through the second aggregating step and the coalescing step, a toner particle having the core-shell structure can be produced.

Exemplary embodiment to be described below are common to the aggregated particle and the second aggregated particle.

The reaching temperature of the dispersion liquid containing the aggregated particle may be equal to or higher than the glass transition temperature (Tg) of the binder resin, and specifically, a temperature higher than the Tg of the binder resin by 10° C. to 30° C. is preferable.

In a case where the aggregated particle contain plural kinds of binder resins having different Tg values, the highest temperature among the Tg values is defined as the glass transition temperature in the coalescing step.

After the coalescing step is completed, the toner particle in the dispersion liquid is subjected to a common washing step, solid-liquid separation step, and drying step to obtain a dried toner particle. In the washing step, from the viewpoint of chargeability, displacement washing with ion exchange water may be sufficiently performed. In the solid-liquid separation step, from the viewpoint of productivity, suction filtration, pressure filtration, or the like may be performed. In the drying step, from the viewpoint of productivity, freeze-drying, air-flow drying, fluid-drying, vibration-type fluid-drying, or the like may be performed.

<Step of Externally Adding External Additive>

The method for producing a toner according to the exemplary embodiment may include a step of externally adding an external additive to the toner particle.

<Electrostatic Charge Image Developer>

The electrostatic charge image developer according to the exemplary embodiment includes at least the toner according to the exemplary embodiment.

The electrostatic charge image developer according to the exemplary embodiment may be a one-component developer containing only the toner according to the exemplary embodiment, or may be a two-component developer in which the toner and a carrier are mixed.

The carrier is not particularly limited, and examples thereof include common carriers. Examples of the carrier include: a coated carrier in which a surface of a core material made of a magnetic powder is coated with the resin: a magnetic powder dispersion-type carrier in which the magnetic powder is dispersed and blended in a matrix resin: and a resin impregnation-type carrier in which a porous magnetic powder is impregnated with the resin.

The magnetic powder dispersion-type carrier and the resin impregnation-type carrier may be carriers in which constituent particles of the carrier are the core materials, and the surface thereof is coated with the resin.

Examples of the magnetic powder include magnetic metals such as iron, nickel, and cobalt, and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene acrylic acid ester copolymer, a straight silicone resin including an organosiloxane bond or a modified product thereof, a fluororesin, polyester, polycarbonate, a phenol resin, an epoxy resin and the like. The coating resin and the matrix resin may contain other additives such as conductive particles. Examples of the conductive particles include particles of metals such as gold, silver, or copper, and particles of carbon black, titanium oxide, zinc oxide, tin oxide, barium sulfate, aluminum borate, and potassium titanate.

Examples of a method for coating the surface of the core material with the resin include a method of coating the surface with a coating layer forming solution in which the coating resin and various additives (used as necessary) are dissolved in an appropriate solvent. The solvent is not particularly limited, and may be selected in consideration of the kind of the resin to be used, coating suitability, and the like.

Specific examples of the resin coating method include an immersion method in which the core material is immersed in the coating layer forming solution, a spray method in which the coating layer forming solution is sprayed onto the surface of the core material, a fluidized bed method in which the coating layer forming solution is sprayed in a state in which the core material is floated by fluidized air, and a kneader coater method in which the core material of the carrier and the coating layer forming solution are mixed in a kneader coater and then the solvent is removed.

A mixing ratio (mass ratio) of the toner to the carrier in the two-component developer may be toner:carrier=1:100 to 30:100, and is preferably 3:100 to 20:100.

<Image Forming Apparatus and Image Forming Method>

An image forming apparatus and an image forming method according to the exemplary embodiment will be described.

An image forming apparatus according to the exemplary embodiment includes: an image carrier; a charging unit that charges a surface of the image carrier; an electrostatic charge image forming unit that forms an electrostatic charge image on the charged surface of the image carrier; a developing unit that accommodates an electrostatic charge image developer and develops, by the electrostatic charge image developer, an electrostatic charge image formed on the surface of the image carrier as a toner image; a transfer unit that transfers the toner image formed on the surface of the image carrier to a surface of a recording medium; and a fixing unit that fixes the toner image transferred to the surface of the recording medium. As the electrostatic charge image developer, the electrostatic charge image developer according to the exemplary embodiment is used.

In the image forming apparatus according to the exemplary embodiment, an image forming method (an image forming method according to the exemplary embodiment) is performed, the image forming method including: a charging step of charging the surface of the image carrier; an electrostatic charge image forming step of forming the electrostatic charge image on the charged surface of the image carrier; a developing step of developing, by the electrostatic charge image developer, the electrostatic charge image formed on the surface of the image carrier as a toner image; a transfer step of transferring the toner image formed on the surface of the image carrier to the surface of the recording medium; and a fixing step of fixing the toner image transferred to the surface of the recording medium.

As the image forming apparatus according to the exemplary embodiment, a common image forming apparatus such as a direct transfer type apparatus that directly transfers the toner image formed on the surface of the image carrier to the recording medium, an intermediate transfer type apparatus that primarily transfers the toner image formed on the surface of the image carrier to a surface of an intermediate transfer body, and secondarily transfers the toner image transferred to the surface of the intermediate transfer body to the surface of the recording medium, an apparatus including a cleaning unit that cleans the surface of the image carrier after the transfer of the toner image and before charging, and an apparatus including an erasing unit that erases the surface of the image carrier by irradiation with erasing light after the transfer of the toner image and before the charging, may be used.

In a case where the image forming apparatus according to the exemplary embodiment is an intermediate transfer type apparatus, the transfer unit includes, for example, an intermediate transfer body having a surface on which a toner image is transferred, a primary transfer unit that primarily transfers the toner image formed on the surface of the image carrier to the surface of the intermediate transfer body, and a secondary transfer unit that secondarily transfers the toner image transferred to the surface of the intermediate transfer body to the surface of the recording medium.

In the image forming apparatus according to the exemplary embodiment, for example, a part including the developing unit may have a cartridge structure (process cartridge) that is detachable from the image forming apparatus. As the process cartridge, for example, a process cartridge that accommodates the electrostatic charge image developer according to the exemplary embodiment and includes a developing unit may be used.

Hereinafter, an example of the image forming apparatus according to the exemplary embodiment will be described, but the image forming apparatus is not limited thereto. In the following description, the parts illustrated in the drawings will be described, and description of the other parts will be omitted.

FIG. 1 is a schematic configuration diagram illustrating the image forming apparatus according to the exemplary embodiment.

The image forming apparatus illustrated in FIG. 1 includes first to fourth electrophotographic image forming units 10Y, 10M, 10C, and 10K (image forming units) that output images of respective colors of yellow (Y), magenta (M), cyan (C), and black (K) based on image data subjected to color separation. These image forming units (hereinafter may also be simply referred to as "unit") 10Y, 10M, 10C, and 10K are arranged side by side at a preset distance from each other in a horizontal direction. These units 10Y, 10M, 10C, and 10K may be process cartridges that are detachable from the image forming apparatus.

Above the units 10Y, 10M, 10C, and 10K, an intermediate transfer belt 20 (an example of the intermediate transfer body) extends through respective units. The intermediate transfer belt 20 is provided by being wound around a drive roll 22 and a support roll 24, and travels in a direction from the first unit 10Y to the fourth unit 10K. A force is applied to the support roll 24 in a direction away from the drive roll 22 by a spring or the like (not shown), and tension is applied to the intermediate transfer belt 20 wound around the drive roll 22 and the support roll 24. An intermediate transfer body cleaning device 30 is provided on a side surface of an image carrier of the intermediate transfer belt 20 so as to face the drive roll 22.

Yellow, magenta, cyan, and black toners contained in toner cartridges 8Y, 8M, 8C, and 8K are supplied to developing devices 4Y, 4M, 4C, and 4K (an example of the developing unit) of the units 10Y, 10M, 10C, and 10K, respectively.

Since the first to fourth units 10Y, 10M, 10C, and 10K have the same configuration and operation, here, the first unit 10Y that is arranged on an upstream side in a traveling direction of the intermediate transfer bell and forms a yellow image, will be described as a representative. 1M, 1C, and 1K in the second to fourth units 10M, 10C, and 10K are photoconductors corresponding to the photoconductor 1Y in the first unit 10Y; 2M, 2C and 2K are charging rolls corresponding to the charging roll 2Y; 3M, 3C, and 3K are laser beams corresponding to the laser beam 3Y; and 6M, 6C, and 6K are photoconductor cleaning devices corresponding to the photoconductor cleaning device 6Y.

The first unit 10Y includes the photoconductor 1Y (an example of the image carrier) that acts as an image carrier. Around the photoconductor 1Y, the following members are arranged in the following order: the charging roll 2Y (an example of the charging unit) that charges a surface of the photoconductor 1Y to a preset potential; an exposure device 3 (an example of the electrostatic charge image forming unit) that exposes the charged surface with the laser beam 3Y based on a color-separated image signal to form an electrostatic charge image; the developing device 4Y (an example of the developing unit) that supplies a charged toner to the electrostatic charge image to develop the electrostatic charge image; a primary transfer roll 5Y (an example of the primary transfer unit) that transfers the developed toner image onto the intermediate transfer belt 20; and the photoconductor cleaning device 6Y (an example of the cleaning unit) that removes the toner remaining on the surface of the photoconductor 1Y after the primary transfer.

The primary transfer roll 5Y is arranged on an inner side of the intermediate transfer belt 20 and is provided at a position facing the photoconductor 1Y. A bias power supply (not shown) that applies a primary transfer bias is connected to each of the primary transfer rolls 5Y, 5M, 5C, and 5K of respective units. Each bias power supply changes a value of the transfer bias applied to each primary transfer roll under the control of a controller (not shown).

Hereinafter, an operation of forming a yellow image in the first unit 10Y will be described.

First, prior to the operation, the surface of the photoconductor 1Y is charged to a potential of −600 V to −800 V by using the charging roll 2Y.

The photoconductor 1Y is formed by laminating a photoconductive layer on a conductive substrate (for example, having a volume resistivity at 20° C. being $1\times10^{-6}$ Ω·cm or less). The photoconductive layer usually has high resistance (resistance of general resin), but has characteristics that when irradiated with a laser beam, the specific resistance of the portion irradiated with the laser beam changes. Therefore, the charged surface of the photoconductor 1Y is irradiated with the laser beam 3Y from the exposure device 3 in accordance with yellow image data sent from the controller (not shown). As a result, an electrostatic charge image having a yellow image pattern is formed on the surface of the photoconductor 1Y.

The electrostatic charge image is an image formed on the surface of the photoconductor 1Y by charging, and is a so-called negative latent image formed by lowering the specific resistance of the portion of the photoconductive layer irradiated with the laser beam 3Y to allow charges on the surface of the photoconductor 1Y to flow and by, on the other hand, leaving charges of a portion not irradiated with the laser beam 3Y.

The electrostatic charge image formed on the photoconductor 1Y rotates to a preset developing position by travelling of the photoconductor 1Y. Then, at this developing position, the electrostatic charge image on the photoconductor 1Y is developed and visualized as a toner image by the developing device 4Y.

In the developing device 4Y, for example, an electrostatic charge image developer containing at least a yellow toner and a carrier is accommodated. The yellow toner is triboelectrically charged by being stirred inside the developing device 4Y, and has charges of the same polarity (negative polarity) as the charges charged on the photoconductor 1Y and is carried on a developer roll (an example of a developer carrier). When the surface of the photoconductor 1Y passes through the developing device 4Y, the yellow toner electrostatically adheres to an erased latent image portion on the surface of the photoconductor 1Y, and the latent image is developed by the yellow toner. The photoconductor 1Y on which the yellow toner image is formed continuously travels at a preset speed, and the toner image developed on the photoconductor 1Y is conveyed to a preset primary transfer position.

When the yellow toner image on the photoconductor 1Y is conveyed to the primary transfer position, a primary transfer bias is applied to the primary transfer roll 5Y, an electrostatic force from the photoconductor 1Y to the primary transfer roll 5Y acts on the toner image, and the toner image on the photoconductor 1Y is transferred to the intermediate transfer belt 20. The transfer bias applied at this time has a polarity (+) opposite to the polarity (−) of the toner, and is controlled to, for example, +10 μA by the controller (not shown) in the first unit 10Y.

The toner remaining on the photoconductor 1Y is removed and collected by the photoconductor cleaning device 6Y.

The primary transfer bias applied to each of the primary transfer rolls 5M, 5C, and 5K of the second unit 10M and the subsequent units is also controlled in the same manner as in the first unit.

In this way, the intermediate transfer belt 20 to which the yellow toner image is transferred by the first unit 10Y is sequentially conveyed through the second to fourth units 10M, 10C, and 10K, and the toner images of the respective colors are superimposed and transferred in a multiple manner.

The intermediate transfer belt 20 onto which the toner images of four colors are transferred in a multiple manner through the first to fourth units arrives at a secondary transfer unit including the intermediate transfer belt 20, the support roll 24 in contact with an inner surface of the intermediate transfer belt, and a secondary transfer roll 26 (an example of a secondary transfer unit) arranged on an image carrying surface side of the intermediate transfer belt 20. On the other hand, a recording sheet P (an example of the recording medium) is fed through a supply mechanism to a gap where the secondary transfer roll 26 and the intermediate transfer belt 20 are in contact with each other at a preset timing, and a secondary transfer bias is applied to the support roll 24. The transfer bias applied at this time has the same polarity (−) as the polarity (−) of the toner. The electrostatic force from the intermediate transfer belt 20 to the recording sheet P acts on the toner image, and the toner image on the intermediate transfer belt 20 is transferred to the recording sheet P. The secondary transfer bias at this time is determined based on the resistance detected by a resistance detection unit (not shown) that detects the resistance of the secondary transfer unit, and is controlled by voltage.

Thereafter, the recording sheet P is sent to a pressure-contacting portion (nip portion) of a pair of fixing rolls in a fixing device 28 (an example of the fixing unit), and the toner image is fixed to the recording sheet P, thereby forming a fixed image.

Examples of the recording sheet P onto which the toner image is transferred include plain paper used in electrophotographic copiers, printers or the like. As the recording medium, in addition to the recording sheet P, an OHP sheet or the like may be used.

In order to further improve the smoothness of an image surface after fixing, the surface of the recording sheet P may also be smooth. For example, coating paper obtained by coating the surface of the plain paper with a resin or the like, art paper for printing, or the like may be used.

The recording sheet P, on which the fixing of the color image is completed, is discharged toward a discharge unit, and a series of color image forming operations is completed.

<Process Cartridge and Toner Cartridge>

The process cartridge according to the exemplary embodiment will be described.

The process cartridge according to the exemplary embodiment includes a developing unit that accommodates the electrostatic charge image developer according to the exemplary embodiment and develops, by the electrostatic charge image developer, the electrostatic charge image formed on the surface of the image carrier as the toner image, and is detachable from the image forming apparatus.

The process cartridge according to the exemplary embodiment is not limited to the above configuration and may be configured to include a developing unit and, if necessary, at least one selected from other units such as an image carrier, a charging unit, an electrostatic charge image forming unit, and a transfer unit.

Hereinafter, an example of the process cartridge according to the exemplary embodiment will be shown, but the process cartridge is not limited thereto. In the following description, the parts shown in the drawings will be described, and description of the other parts will be omitted.

Figure 2:
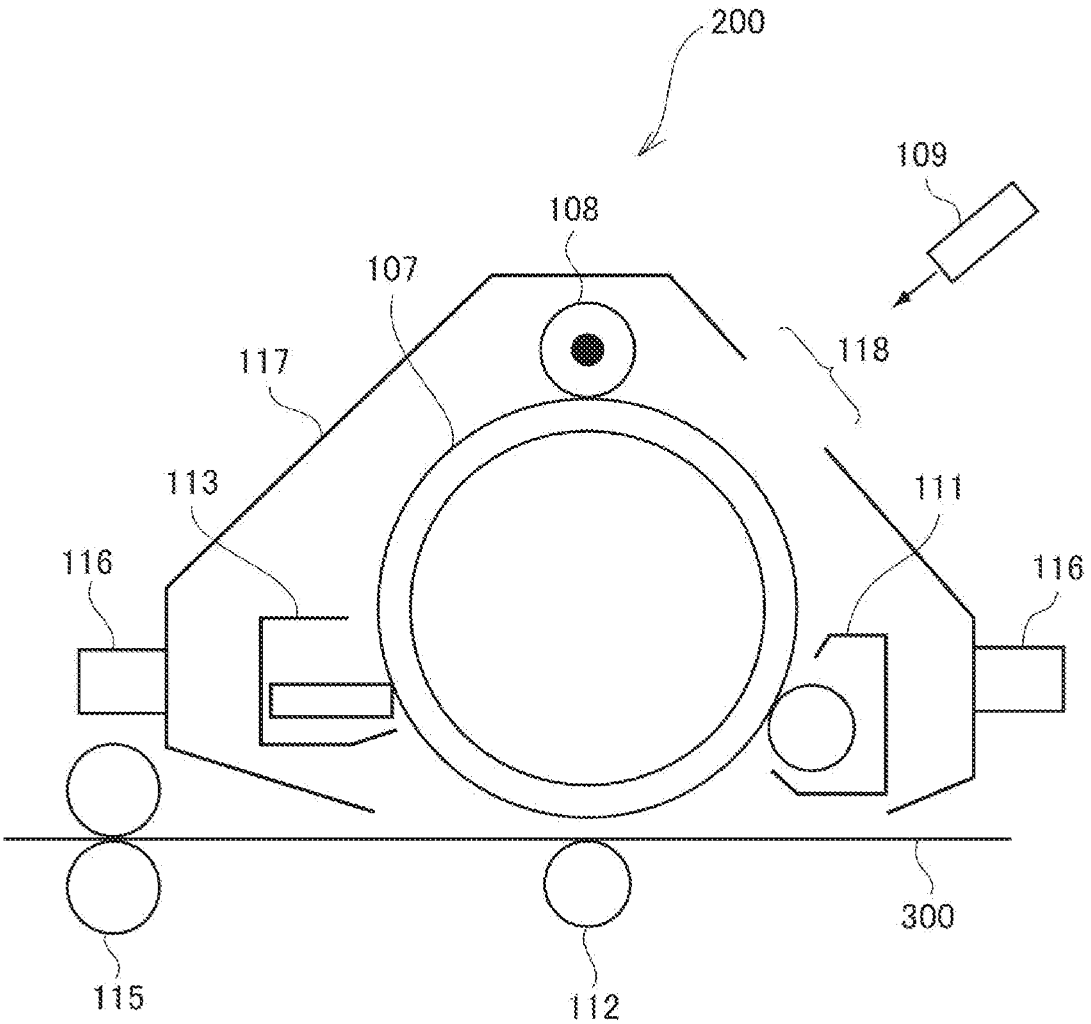
FIG. 2 is a schematic configuration diagram illustrating an example of a process cartridge detachable from the image forming apparatus according to the exemplary embodiment.

FIG. 2 is a schematic configuration diagram illustrating the process cartridge according to the exemplary embodiment.

A process cartridge 200 shown in FIG. 2 is configured as a cartridge by, for example, integrally combining and holding a photoconductor 107 (an example of the image carrier), a charging roll 108 (an example of the charging unit), an image developing device 111 (an example of the developing unit), and a photoconductor cleaning device 113 (an example of a cleaning unit), each provided around the photoconductor 107 by a housing 117 having a mounting rail 116 and an opening 118 for exposure.

In FIG. 2, the reference numeral 10) denotes an exposure device (an example of the electrostatic charge image forming unit), the reference numeral 112 denotes a transfer device (an example of the transfer unit), the reference numeral 115 denotes a fixing device (an example of the fixing unit), and the reference numeral 300 denotes recording sheet (an example of the recording medium).

Next, the toner cartridge according to the exemplary embodiment will be described.

The toner cartridge according to the exemplary embodiment accommodates the toner according to the exemplary embodiment and is detachable from the image forming apparatus. The toner cartridge accommodates a toner for replenishment to be supplied to the developing unit provided in the image forming apparatus.

The image forming apparatus illustrated in FIG. 1 is an image forming apparatus having a configuration in which the toner cartridges 8Y, 8M, 8C, and 8K are detachable, and the developing devices 4Y, 4M, 4C, and 4K are connected to toner cartridges corresponding to the respective developing devices (colors) by toner supply pipes (not illustrated). In a case where the amount of the toner accommodated in the toner cartridge decreases, the toner cartridge is replaced.

EXAMPLES

Hereinafter, the exemplary embodiment according to the invention will be described in detail with reference to Examples, but the exemplary embodiment according to the invention is not limited to these Examples.

In the following description, all "parts" and "%" are based on mass unless otherwise specified.

Synthesis, treatment, production, and the like are performed at a room temperature (25° C.±3° C.), unless otherwise specified.

<Preparation of Particle Dispersion Liquid>

<Preparation of Polyester Resin Particle Dispersion Liquid (M)>

Terephthalic acid: 33 parts by mole
Fumaric acid: 70 parts by mole
Trimellitic acid: 2 parts by mole
Bisphenol A ethylene oxide adduct: 5 parts by mole
Bisphenol A propylene oxide adduct: 95 parts by mole The above materials are put in a flask equipped with a stirrer, a nitrogen inlet tube, a temperature sensor, and a rectifying column, the temperature is raised to 220° C. over 1 hour, and 1 part of titanium tetraethoxide is added to 100 parts of the above materials. The temperature is raised to 230° C. over 30 minutes while distilling off generated water, and a dehydration condensation reaction is continued at the temperature for 1 hour, and then a reaction product is cooled to obtain an polyester resin (I) (weight average molecular weight: 17,000, glass transition temperature: 60° C.).

40 parts of ethyl acetate and 25 parts of 2-butanol are added to a vessel equipped with a temperature control unit and a nitrogen substitution unit to prepare a mixed solvent, and then 100 parts of the polyester resin (1) is gradually put into the vessel and dissolved. Here, a 10% ammonia aqueous solution (corresponding to 3 times an acid value of the resin in terms of a molar ratio) is added thereto and stirred for 30 minutes. Next, an inside of the vessel is replaced with dry nitrogen, the temperature is maintained at 40° C., and 400 parts of ion exchange water is added dropwise while stirring a mixed solution to perform emulsification. After completion of the dropwise addition, the temperature of the emulsion is returned to 25° C. to obtain a dispersion liquid in which resin particles having a volume average particle diameter of 170 nm are dispersed. Ion exchange water is added to the dispersion liquid to adjust a solid content to 20%, thereby obtaining a polyester resin particle dispersion liquid (1). A value of a zeta potential of the polyester resin particle dispersion liquid (1) is measured and found to be −64 mV.

<Preparation of Polyester Resin Particle Dispersion Liquid (2)>

Terephthalic acid: 30 parts by mole
Fumaric acid: 70 parts by mole
Bisphenol A ethylene oxide adduct: 5 parts by mole
Bisphenol A propylene oxide adduct: 95 parts by mole The above materials are put in a flask equipped with a stirrer, a nitrogen inlet tube, a temperature sensor, and a rectifying column, the temperature is raised to 220° C. over 1 hour, and 1 part of titanium tetraethoxide is added to 100 parts of the above materials. The temperature is raised to 230° C. over 30 minutes while distilling off generated water, and a dehydration condensation reaction is continued at the temperature for 1 hour, and then a reaction product is cooled to obtain an polyester resin (2) (weight average molecular weight: 18,000, glass transition temperature: 59° C.).

40 parts of ethyl acetate and 25 parts of 2-butanol are added to a vessel equipped with a temperature control unit and a nitrogen substitution unit to prepare a mixed solvent, and then 100 parts of the polyester resin (2) is gradually put into the vessel and dissolved. Here, a 100% ammonia aqueous solution (corresponding to 3 times an acid value of the resin in terms of a molar ratio) is added thereto and stirred for 30 minutes. Next, an inside of the vessel is replaced with dry nitrogen, the temperature is maintained at 40° C., and 400 parts of ion exchange water is added dropwise while stirring a mixed solution to perform emulsification. After completion of the dropwise addition, the temperature of the emulsion is returned to 25° C. to obtain a dispersion liquid in which resin particles having a volume average particle diameter of 180 nm are dispersed. Ion exchange water is added to the dispersion liquid to adjust a solid content to 20%, thereby obtaining a polyester resin particle dispersion liquid (2). A value of a zeta potential of the polyester resin particle dispersion liquid (2) is measured and found to be −46 mV.

<Preparation of Releasing Agent Particle Dispersion Liquid (1)>

Paraffin wax (HNP-0190 manufactured by Nippon Seiro Co., Ltd., melting temperature: 89° C.): 100 parts
Anionic surfactant (NEOGEN RK manufactured by Daiichi Kogyo Seiyaku Co., Ltd.): 4 parts
Ion exchange water: 350 parts The above materials are mixed and heated to 110° C. and dispersed using the homogenizer (ULTRA-TURRAX T50 manufactured by IKA-Werke). Next, a dispersion treatment is performed using a pressure discharge type Gaulin homogenizer. Next, a liquid temperature is cooled to 40° C., the temperature is maintained for 1 hour, and then the liquid temperature is cooled to 25° C. Water is added to adjust a solid content thereof to 20%, thereby obtaining a releasing agent particle dispersion liquid (1). A volume average particle diameter of the releasing agent particle dispersion liquid (1) is 210 nm. A value of a zeta potential of the releasing agent particle dispersion liquid (1) is measured and found to be −62 mV.

<Preparation of Releasing Agent Particle Dispersion Liquid (2)>

Paraffin wax (HNP-0190 manufactured by Nippon Seiro Co., Ltd., melting temperature: 89° C.): 100 parts
Anionic surfactant (NEOGEN RK manufactured by Daiichi Kogyo Seiyaku Co., Ltd.): 2 parts
Ion exchange water: 350 parts The above materials are mixed and heated to 110° C. and dispersed using the homogenizer (ULTRA-TURRAX T50 manufactured by IKA-Werke). Next, a dispersion treatment is performed using a pressure discharge type Gaulin homogenizer. Next, a liquid temperature is cooled to 40° C., the temperature is maintained for 1 hour, and then the liquid temperature is cooled to 25° C. Water is added to adjust a solid content thereof to 20%, thereby obtaining a releasing agent particle dispersion liquid (2). A volume average particle diameter of the releasing agent particle dispersion liquid (2) is 210 nm. A value of a zeta potential of the releasing agent particle dispersion liquid (2) is measured and found to be −50 mV.

<Preparation of Releasing Agent Particle Dispersion Liquid (3)>

Paraffin wax (HNP-0190 manufactured by Nippon Seiro Co., Ltd., melting temperature: 89° C.): 100 parts
Anionic surfactant (NEOGEN RK manufactured by Daiichi Kogyo Seiyaku Co., Ltd.): 1.5 parts
Ion exchange water: 350 parts The above materials are mixed and heated to 110° C. and dispersed using the homogenizer (ULTRA-TURRAX TSO manufactured by IKA-Werke). Next, a dispersion treatment is performed using a pressure discharge type Gaulin homogenizer. Next, a liquid temperature is cooled to 40° C., the temperature is maintained for 30 minutes, and then the liquid temperature is cooled to 25° C. Water is added to adjust a solid content thereof to 20%, thereby obtaining a releasing agent particle dispersion liquid (3). A volume average particle diameter of the releasing agent particle dispersion liquid (3) is 210 nm. A value of a zeta potential of the releasing agent particle dispersion liquid (3) is measured and found to be −37 mV.

<Preparation of Releasing Agent Particle Dispersion Liquid (4)>

Paraffin wax (HNP-4190 manufactured by Nippon Seiro Co., Ltd., melting temperature: 89° C.: 100 parts Anionic surfactant (NEOGEN RK manufactured by Daiichi Kogyo Seiyaku Co., Ltd.): 1 part Ion exchange water: 350 parts The above materials are mixed and heated to 100° C. and dispersed using the homogenizer (ULTRA-TURRAX T50 manufactured by IKA-Werke). Next, a dispersion treatment is performed using a pressure discharge type Gaulin homogenizer. Next, a liquid temperature is cooled to 25° C., water is added to adjust a solid content thereof to 20%, thereby obtaining a releasing agent particle dispersion liquid (4). A volume average particle diameter of the releasing agent particle dispersion liquid (4) is 220 nm. A value of a zeta potential of the releasing agent particle dispersion liquid (4) is measured and found to be −20 mV.

<Preparation of Releasing Agent Particle Dispersion Liquid (5)>

Ester wax (WEP-5 manufactured by NOF Corporation, melting temperature 85° C.): 100 parts Anionic surfactant (NEOGEN RK manufactured by Daiichi Kogyo Seiyaku Co., Ltd.): 4 parts Ion exchange water: 350 parts The above materials are mixed and heated to 110° C. and dispersed using the homogenizer (ULTRA-TURRAX T50 manufactured by IKA-Werke). Next, a dispersion treatment is performed using a pressure discharge type Gaulin homogenizer. Next, a liquid temperature is cooled to 40° C., the temperature is maintained for 1 hour, and then the liquid temperature is cooled to 25° C. Water is added to adjust a solid content thereof to 20%, thereby obtaining a releasing agent particle dispersion liquid (5). A volume average particle diameter of the releasing agent particle dispersion liquid (5) is 200 nm. A value of a zeta potential of the releasing agent particle dispersion liquid (5) is measured and found to be −59 mV.

<Preparation of Releasing Agent Particle Dispersion Liquid (6)>

Paraffin wax (HNP-9 manufactured by Nippon Seiro Co., Ltd., melting temperature 75° C.): 100 parts Anionic surfactant (NEOGEN RK manufactured by Daiichi Kogyo Seiyaku Co., Ltd.): 4 parts Ion exchange water: 350 parts The above materials are mixed and heated to 110° C. and dispersed using the homogenizer (ULTRA-TURRAX T50 manufactured by IKA-Werke). Next, a dispersion treatment is performed using a pressure discharge type Gaulin homogenizer. Next, a liquid temperature is cooled to 40° C., the temperature is maintained for 1 hour, and then the liquid temperature is cooled to 25° C. Water is added to adjust a solid content thereof to 20%, thereby obtaining a releasing agent particle dispersion liquid (6). A volume average particle diameter of the releasing agent particle dispersion liquid (6) is 200 nm. A value of a zeta potential of the releasing agent particle dispersion liquid (6) is measured and found to be −59 mV.

<Preparation of Releasing Agent Particle Dispersion Liquid (7)>

Paraffin wax (FT-100 manufactured by Nippon Seiro Co., Ltd., melting temperature 98° C.): 100 parts Anionic surfactant (NEOGEN RK manufactured by Daiichi Kogyo Seiyaku Co., Ltd.): 4 parts Ion exchange water: 350 parts The above materials are mixed and heated to 110° C. and dispersed using the homogenizer (ULTRA-TURRAX TSO manufactured by IKA-Werke). Next, a dispersion treatment is performed using a pressure discharge type Gaulin homogenizer. Next, a liquid temperature is cooled to 40° C., the temperature is maintained for 1 hour, and then the liquid temperature is cooled to 25° C. Water is added to adjust a solid content thereof to 20%, thereby obtaining a releasing agent particle dispersion liquid (7). A volume average particle diameter of the releasing agent particle dispersion liquid (7) is 200 nm. A value of a zeta potential of the releasing agent particle dispersion liquid (7) is measured and found to be −63 mV.

<Preparation of Colorant Particle Dispersion Liquid (C)>

Cyan pigment (Pigment Blue 15:3, manufactured by Dainichiseika Color & Chemicals Mfg. Co., Ltd.): 50 parts Anionic surfactant (NEOGEN RK manufactured by Daiichi Kogyo Seiyaku Co., Ltd.): 5 parts Ion exchange water: 195 parts The above materials are mixed and subjected to a dispersion treatment for 60 minutes using a high-pressure impact type disperser (ULTIMAIZER HJP30006 manufactured by Sugino Machine Limited) to obtain a colorant particle dispersion liquid (C) having a solid content of 20%.

Example 1

<Mixing Step>

Ion exchange water: 215 parts

Polyester resin particle dispersion liquid (1): 290 parts

Releasing agent particle dispersion liquid (3): 40 parts

Colorant particle dispersion liquid (C): 20 parts

Anionic surfactant (NEOGEN RK manufactured by Daiichi Kogyo Seiyaku Co., Ltd.): 2.8 parts The above materials are placed in a reaction vessel equipped with a thermometer, a pH meter, and a stirrer. A temperature is controlled to 30° C. by a mantle heater from an outside of the reaction vessel, and the reaction vessel is maintained for 30 minutes while stirring at a stirring rotation speed of 150 rpm. Next, a pH of the mixed dispersion liquid is adjusted to 3.0 with a 0.3N nitric acid aqueous solution.

<First Aggregating Step>

A PAC aqueous solution is prepared by dissolving 0.7 parts of polyaluminum chloride (Oji Paper Co., Ltd., active ingredient: 30%, powder product) in 7 parts of ion exchange water. The PAC aqueous solution is added while the mixed dispersion liquid is dispersed by a homogenizer (ULTRA-TURRAX T50, manufactured by IKA-Werke). Next, a temperature of the mixed dispersion liquid is raised to 50° C. while stirring the mixed dispersion liquid. When the temperature of the dispersion liquid reaches 50° C., the particle diameter of the aggregated particles is measured by Coulter Multisizer II (aperture diameter: 50 μm), and the volume average particle diameter is 5.0 μm.

<Second Aggregating Step>

A pH of 150 parts of the polyester resin particle dispersion liquid (1) is adjusted to 4.0 with the 0.3N nitric acid aqueous solution, and the aqueous solution is added to the dispersion liquid containing the aggregated particles while continuing stirring. Next, the temperature of the dispersion liquid is raised to 50° C. while stirring the dispersion liquid. When the temperature of the dispersion liquid reaches 50° C., the particle diameter of the second aggregated particles is measured by Coulter Multisizer II (aperture diameter: 50 μm), and the volume average particle diameter is 5.8 μm.

20 parts of a 10% aqueous solution of sodium nitrilotriacetate (Chelest 70, manufactured by Chelest Corporation) is added to the dispersion liquid containing the second aggregated particles, and then the pH is adjusted to 9.0 with a 1N aqueous sodium hydroxide solution.

<Coalescing Step>

The dispersion liquid containing the second aggregated particles is heated to 87° C. and maintained for 60 minutes. Next, the dispersion liquid is cooled to the room temperature, and the solid content is separated by filtration. The solid content is re-dispersed in the ion exchange water, the filtration is repeated, and washing is performed until an electrical conductivity of a filtrate became 20 μS/cm or less. Next, the solid content is vacuum-dried in a vacuum dryer at an internal temperature of 40° C. for 5 hours to obtain toner particles. A volume average particle diameter of the toner particles is 5.8 μm.

<Addition of External Additive>

100 parts of the toner particles and 1.5 parts of hydrophobic silica particles (RY50 manufactured by Nippon Aerosil Co., Ltd.) are put into a sample mill and mixed at a rotation speed of 10,000 rpm for 30 seconds. Then, a mixture is sieved with a vibrating sieve having an opening of 45 μm to obtain a toner.

<Preparation of Carrier>

Mn—Mg—Sr ferrite particles (average particle diameter 40 μm): 100 parts
Toluene: 14 parts
Polymethyl methacrylate: 2 parts
Carbon black (Cabot Corporation, VXC72): 0.12 parts The materials except for the ferrite particles and glass beads (diameter: 1 mm, the same amount as that of toluene) are mixed, and a mixture is stirred for 30 minutes at a rotation speed of 1,200 rpm using a sand mill manufactured by Kansai Paint Co., Ltd., to obtain a dispersion liquid. The dispersion liquid and the ferrite particles are put into a vacuum degassing kneader, and are dried under reduced pressure while being stirred, thereby obtaining a carrier.

<Preparation of Developer>

10 parts of the toner and 100 parts of the carrier are put into a V-blender, stirred for 20 minutes, and then sieved with a vibrating sieve having an opening of 212 μm to obtain a developer.

Examples 2 to 21 and Comparative Examples 1 to 3

Toner particles are obtained in the same manner as in Example 1, except that a production process is changed to those shown in Table 1. Next, in the same manner as in Example 1, an external additive is added to the toner particles and mixed with the carrier to obtain a developer.

<Performance Evaluation>

<Crushing of Toner>

A developing device of a modified machine (an image forming apparatus modified so as to perform fixing by an external fixing machine whose fixing temperature is variable) of DocuCentre Color f450 manufactured by Fuji Xerox Co., Ltd. is filled with the developer. Using this image forming apparatus, a solid image having an area ratio of 50% is continuously output on 3,000 sheets of A3 size plain paper at a low temperature and a low humidity (temperature of 10° C. and relative humidity of 15%). After the output, toner crushing on a photoconductor by a cleaning blade and toner filming on the photoconductor (generation of film streaks due to the toner crushing) are visually observed. Further, surfaces of a central portion and both end portions of the photoconductor and the cleaning blade are observed with a microscope (at a magnification of 100 times) and, the results are classified as follows.

A: No toner filming and toner crushing are observed by the microscope.
B: The toner filming is slightly thin and 1 to 2 toner filming are observed by the microscope, but the toner filming is not visually observed, and the toner crushing is not observed in the cleaning blade.
C: 1 to 2 toner filming are observed by the microscope but are not visually observed, and the toner crushing is not observed in the cleaning blade.
D: 3 to 4 toner filming are observed by the microscope but are not visually observed, and the toner crushing is not observed in the cleaning blade.
E: No toner filming is visually observed, and slight toner crushing is observed in the cleaning blade to an extent that there is no problem in practical use.
F: The toner filming is observed on the photoconductor, and there is a problem in practical use.

TABLE 1

| | Production process | | | | | | | |
|---|---|---|---|---|---|---|---|---|
| | Polyester resin particle dispersion liquid | | Releasing agent particle dispersion liquid | | | | Difference between | |
| | Kind — | Zeta potential mV | Kind — | Melting temperature ° C. | Zeta potential mV | Usage amount Parts by mass | zeta potentials mV | Coalescing temperature ° C. |
| Comparative Example 1 | (1) | −64 | (4) | 89 | −20 | 40 | 44 | 87 |
| Comparative Example 2 | (2) | −46 | (2) | 89 | −50 | 40 | 4 | 96 |
| Comparative Example 3 | (2) | −46 | (2) | 89 | −50 | 40 | 4 | 78 |
| Example 1 | (1) | −64 | (3) | 89 | −37 | 40 | 27 | 87 |
| Example 2 | (1) | −64 | (2) | 89 | −50 | 40 | 14 | 87 |
| Example 3 | (1) | −64 | (1) | 89 | −62 | 40 | 2 | 87 |
| Example 4 | (1) | −64 | (1) | 89 | −62 | 50 | 2 | 87 |
| Example 5 | (1) | −64 | (1) | 89 | −62 | 60 | 2 | 87 |
| Example 6 | (2) | −46 | (4) | 89 | −20 | 10 | 26 | 87 |
| Example 7 | (2) | −46 | (4) | 89 | −20 | 20 | 26 | 87 |
| Example 8 | (2) | −46 | (4) | 89 | −20 | 40 | 26 | 87 |
| Example 9 | (2) | −46 | (4) | 89 | −20 | 50 | 26 | 87 |
| Example 10 | (2) | −46 | (3) | 89 | −37 | 40 | 9 | 87 |

TABLE 1-continued

| | | | | | | | | |
|---|---|---|---|---|---|---|---|---|
| Example 11 | (2) | −46 | (2) | 89 | −50 | 40 | 4 | 87 |
| Example 12 | (2) | −46 | (1) | 89 | −62 | 10 | 16 | 87 |
| Example 13 | (2) | −46 | (1) | 89 | −62 | 20 | 16 | 87 |
| Example 14 | (2) | −46 | (1) | 89 | −62 | 40 | 16 | 87 |
| Example 15 | (2) | −46 | (1) | 89 | −62 | 50 | 16 | 87 |
| Example 16 | (2) | −46 | (5) | 85 | −59 | 40 | 13 | 83 |
| Example 17 | (2) | −46 | (5) | 85 | −59 | 50 | 13 | 83 |
| Example 18 | (2) | −46 | (6) | 75 | −59 | 40 | 13 | 87 |
| Example 19 | (2) | −46 | (6) | 75 | −59 | 50 | 13 | 87 |
| Example 20 | (2) | −46 | (7) | 98 | −63 | 40 | 17 | 87 |
| Example 21 | (2) | −46 | (7) | 98 | −63 | 50 | 17 | 87 |

| | Cross section observation of toner particles | | | | | |
|---|---|---|---|---|---|---|
| | Releasing agent domain having long diameter of 500 nm to 1,000 nm | | | Releasing agent domain having long diameter of 50 nm or more | | |
| | Requirement (1) average number per toner particle Number | Requirement (2) average aspect ratio — | Requirement (3) toner particle having at least 10 % by number | Requirement (A) average distance be-tween domains nm | Requirement (B) area ratio of domain % | Crushing — |
| Comparative Example 1 | 4 | 6 | 3 | 600 | 6 | F |
| Comparative Example 2 | 3 | 4 | 2 | 800 | 7 | F |
| Comparative Example 3 | 0 | — | 0 | 140 | 6 | F |
| Example 1 | 8 | 7 | 12 | 350 | 6 | E |
| Example 2 | 11 | 7 | 42 | 230 | 6 | B |
| Example 3 | 13 | 8 | 73 | 210 | 7 | A |
| Example 4 | 14 | 8 | 75 | 190 | 10 | B |
| Example 5 | 15 | 8 | 77 | 170 | 12 | D |
| Example 6 | 7 | 5 | 7 | 340 | 2 | E |
| Example 7 | 8 | 5 | 16 | 320 | 4 | D |
| Example 8 | 9 | 6 | 16 | 280 | 6 | D |
| Example 9 | 10 | 5 | 27 | 240 | 8 | C |
| Example 10 | 11 | 7 | 55 | 220 | 5 | A |
| Example 11 | 12 | 6 | 71 | 200 | 6 | A |
| Example 12 | 8 | 6 | 11 | 300 | 2 | E |
| Example 13 | 9 | 6 | 35 | 290 | 4 | C |
| Example 14 | 10 | 7 | 45 | 260 | 6 | B |
| Example 15 | 13 | 7 | 63 | 210 | 9 | A |
| Example 16 | 9 | 1 | 36 | 270 | 6 | D |
| Example 17 | 11 | 1 | 51 | 230 | 9 | C |
| Example 18 | 8 | 5 | 42 | 260 | 7 | D |
| Example 19 | 11 | 3 | 53 | 220 | 9 | C |
| Example 20 | 10 | 8 | 22 | 270 | 5 | D |
| Example 21 | 12 | 9 | 35 | 210 | 7 | C |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An electrostatic charge image developing toner comprising:

a toner particle containing a binder resin and a releasing agent, wherein the following requirement (1) is satisfied in cross section observation of the toner particle:

requirement (1): the number of a releasing agent domain having a long diameter of 500 nm or more and 1,000 nm or less is 7 or more on average per toner particle.

2. The electrostatic charge image developing toner according to claim 1, wherein the following requirement (A) is satisfied in the cross section observation of the toner particle:

requirement (A): a distance between releasing agent domains each having a long diameter of 50 nm or more, that are next to each other, is 200 nm or more on average.

3. The electrostatic charge image developing toner according to claim 1, wherein the following requirement (2) is satisfied in the cross section observation of the toner particle:

requirement (2): an aspect ratio of the releasing agent domain having a long diameter of 500 nm or more and 1,000 nm or less is 3 or more and 10 or less on average.

4. The electrostatic charge image developing toner according to claim 2, wherein the following requirement (2) is satisfied in the cross section observation of the toner particle:

requirement (2): an aspect ratio of the releasing agent domain having a long diameter of 500 nm or more and 1,000 nm or less is 3 or more and 10 or less on average.

5. The electrostatic charge image developing toner according to claim 1, wherein the following requirement (3) is satisfied in the cross section observation of the toner particle:

requirement (3): a number percentage of a toner particle containing at least 10 releasing agent domains each having a long diameter of 500 nm or more and 1,000 nm or less is 30% by number or more.

6. The electrostatic charge image developing toner according to claim 5, wherein the following requirement (3') is satisfied in the cross section observation of the toner particle:

requirement (3'): the number percentage of the toner particle containing at least 10 releasing agent domains each having a long diameter of 500 nm or more and 1,000 nm or less is 50% by number or more.

7. The electrostatic charge image developing toner according to claim 1, wherein the following requirement (B) is satisfied in the cross section observation of the toner particle:

requirement (B): an area ratio of a releasing agent domain having a long diameter of 50 nm or more is 3% or more and 10% or less on average.

8. The electrostatic charge image developing toner according to claim 1, wherein a melting temperature of the releasing agent is 80° C. or higher and 95° C. or lower.

9. An electrostatic charge image developer comprising the electrostatic charge image developing toner according to claim 1.

10. A method for producing an electrostatic charge image developing toner, the method comprising:

mixing a binder resin particle dispersion liquid containing a binder resin particle and a releasing agent particle dispersion liquid containing a releasing agent particle to prepare a mixed dispersion liquid containing the binder resin particle and the releasing agent particle;

aggregating the binder resin particle and the releasing agent particle in the mixed dispersion liquid to form an aggregated particle; and heating the dispersion liquid containing the aggregated particle to fuse and coalesce the aggregated particle, thereby forming a toner particle, wherein a zeta potential of the binder resin particle dispersion liquid and a zeta potential of the releasing agent particle dispersion liquid are both negative values, and a difference between a value of the zeta potential of the binder resin particle dispersion liquid and a value of the zeta potential of the releasing agent particle dispersion liquid is 0 mV or more and 30 mV or less.

11. The method for producing an electrostatic charge image developing toner according to claim 10, wherein the value of the zeta potential of the releasing agent particle dispersion liquid is −70 mV or more and −30 mV or less.

12. The method for producing an electrostatic charge image developing toner according to claim 10, wherein the mixed dispersion liquid contains a surfactant, and a content of the surfactant relative to a total mass of the mixed dispersion liquid is 1 mass % or more and 3 mass % or less.

13. An electrostatic charge image developing toner produced by the method for producing an electrostatic charge image developing toner according to claim 10.

14. An electrostatic charge image developer comprising an electrostatic charge image developing toner produced by the method for producing an electrostatic charge image developing toner according to claim 10.

15. A toner cartridge that accommodates the electrostatic charge image developing toner according to claim 1 and is detachable from an image forming apparatus.

16. A process cartridge comprising:

a developing unit that accommodates the electrostatic charge image developer according to claim 9 and develops an electrostatic charge image formed on a surface of an image carrier as a toner image by the electrostatic charge image developer, wherein the process cartridge is detachable from an image forming apparatus.

17. An image forming apparatus comprising:

an image carrier;

a charging unit that charges a surface of the image carrier;

an electrostatic charge image forming unit that forms an electrostatic charge image on the charged surface of the image carrier;

a developing unit that accommodates the electrostatic charge image developer according to claim 9 and develops the electrostatic charge image formed on the surface of the image carrier as a toner image by the electrostatic charge image developer;

a transfer unit that transfers the toner image formed on the surface of the image carrier to a surface of a recording medium; and a fixing unit that fixes the toner image transferred to the surface of the recording medium.

18. An image forming method comprising:

charging a surface of an image carrier;

forming an electrostatic charge image on the charged surface of the image carrier, developing the electrostatic charge image formed on the surface of the image carrier as a toner image using the electrostatic charge image developer according to claim 9;

transferring the toner image formed on the surface of the image carrier to a surface of a recording medium; and fixing the toner image transferred to the surface of the recording medium.

* * * * *